United States Patent [19]
Joslyn

[11] 3,861,875
[45] Jan. 21, 1975

[54] STERILITY ANALYZER
[75] Inventor: Larry James Joslyn, Walworth, N.Y.
[73] Assignee: Sybron Corporation, Rochester, N.Y.
[22] Filed: June 8, 1973
[21] Appl. No.: 368,452

[52] U.S. Cl............... 23/230 B, 23/253 R, 21/94, 21/103
[51] Int. Cl......................... A61l 3/02, G01n 33/16
[58] Field of Search ......... 23/230 B, 230 R, 253 R, 21/103, 94

[56] References Cited
UNITED STATES PATENTS
3,450,489  6/1969  Fay........................... 21/103 X
3,571,563  10/1968  Shulz................................. 21/94 X
3,586,859  2/1970  Katz et al..................... 23/230 B X
3,598,517  5/1969  Beecher........................... 21/103 X Primary Examiner—Robert M. Reese
Attorney, Agent, or Firm—Theodore B. Roessel; Roger Aceto; J. Stephen Yeo

[57] ABSTRACT

A sterility analyzer which continuously senses various sterilizing effecting environmental conditions within the sterilizing chamber and then converts such information to an output signal representative of the death rate of a given microorganism within the chamber. Such signal is then used to control the operation of the sterilizer and/or associated equipment.

9 Claims, 2 Drawing Figures

PATENTED JAN 21 1975          3,861,875

ETHYLENE OXIDE 1200 MG/LITER
RELATIVE HUMIDITY 40%
BACILLUS SUBTILIS VAR. NIGER

STERILITY ANALYZER

BACKGROUND OF THE INVENTION

The present invention relates to sterilization and more specifically to a sterility analyzer for continuously monitoring and controlling the operation of a sterilizer in order to terminate operation when a sterile condition has been achieved.

It is well known that various environmental factors have an influence on sterilization or the killing of micro-organisms. Such factors are for example, temperature, relative humidity and, in gas sterilization, the concentration of the sterilizing gas. The usual procedure in any sterilization process is to sense when one or more of these factors have reached some predetermined level appropriate to the sterilization procedure and then to measure the timed sterilization cycle from such point. Sensors located within the sterilizing chamber and even within the goods to be sterilized has been employed for such purposes. These sensors are usually of the type which issue a single "one shot" signal when a predetermined condition, such as temperature, etc. has been reached for starting a timed sterilizing period.

Unfortunately, there may be a change in the environment conditions during the sterilizing cycle which may have an effect on sterilization. For example, an increase in temperature which would increase the death rate of the micro-organism and reduce the over-all time needed for sterilization is not sent by a "one shot" sensor. Accordingly, the prior art which commences the sterilizing cycle on the attainment of certain preselected conditions may result in an overkill or underkill for a given timed cycle depending upon whether there was an improvement or reduction respectively in the sterilizing effecting environmental conditions within the sterilizer.

It is also known in the art that the death rate of any given micro-organism will follow the same pattern when exposed to the same set of conditions. As a result, a family of curves can be generated showing the death rate obtained by varying any one of a given set of conditions. The present invention makes use of this known fact by providing sensors within the sterilizing chamber for continuously sensing the various sterilizing effecting environmental conditions. A signal generated by each sensor is converted to a kill factor or death rate corresponding to the sensed condition. An integrator then sums all of the death rates over a given time interval to obtain a total kill. The output from the integrator may then be used to terminate the sterilizing cycle when sterility has been achieved and/or indicate which items were or were not sterilized and the factor of sterilization or non-sterilization.

SUMMARY OF THE INVENTION

The present invention may be characterized in one aspect thereof, by the provision of a plurality of sensor means within a sterilizing chamber, each sensor being capable of continuously monitoring a different sterilization affecting environmental condition and issuing a signal representative of such condition; a logic circuit outside of the sterilizing chamber receiving the signals from the sensor and converting each of the signals to an output indicative of a kill factor or death rate for a given micro-organism at each of the sensed conditions; and an integrator receiving all of the output signals and summing the same over a timed interval to obtain a total kill for the given micro-organism.

OBJECTS OF THE INVENTION

One object of the present invention is to provide a sterility indicator capable of continuously monitoring the death rate of a given micro-organism within the sterilizing chamber.

Another object of the present invention is to provide a sterility indicator capable of terminating the operation of a sterilizer when a predetermined precent of a given micro-organism has been killed.

A further object of the present invention is to provide a sterility analyzer which monitors various sterility effecting environmental conditions within the sterilizing chamber and issues an output signal corresponding to the death rate of a given micro-organism for each of the sensed conditions, the output signals being integrated to obtain a total kill factor for the given micro-organism.

These and other objects, advantages and characterizing features of the present invention will become more apparent upon consideration of the following detailed description thereof when taken in connection with the accompanying drawings depicting the same.

DESCRIPTION OF THE PREFERRED EMBODIMENTS

Figure 1:
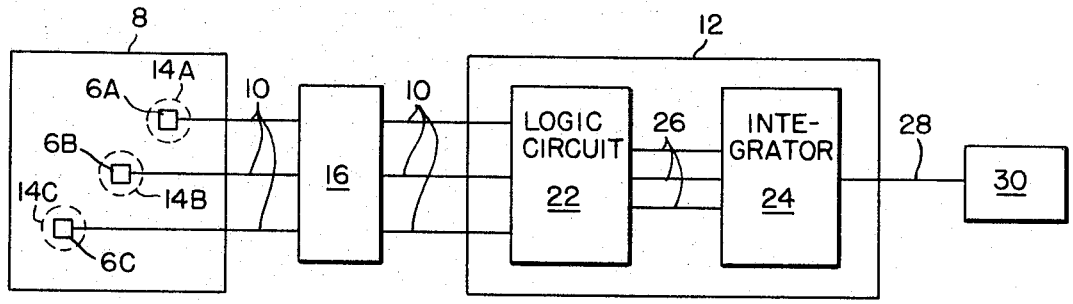
FIG. 1 is a schematic representation of a sterilizer employing the sterility analyzer of the present invention and showing a block diagram of the various stages of the sterility analyzer.

Referring to the drawings, FIG. 1 shows a bank of sensors 6 A–C located within a sterilizing chamber 8, each of the sensors being connected by leads 10 to a sterility analyzer 12. Sensors 6 are of a type well known in the art which can continuously monitor the environmental conditions within the sterilizing chamber, each sensor monitoring one such condition. For example, the three sensors 6A, 6B and 6C when used in a gas sterilizing cycle may monitor respectively, temperature, humidity and concentration of sterilizing gas, usually ethylene oxide.

During some sterilization processes, ideal conditions are possible, such as, for example, in the surface sterilization of material where conditions can be accurately controlled. In the usual case, however, there are barriers to sterilization which retard the rate of sterilization. For example, the temperature at the center of a pack in the sterilizer raises at a slower rate than the temperature in the sterilization chamber outside of the pack. In gas sterilization processes, there is a time delay as the gas defuses across the package membrane in which the articles to be sterilized are sealed.

Therefore, "barrier's which represent the "worst load" condition should be incorporated into the sensing devices. These barriers are shown schematically at 14A, B and C respectfully. As a practical matter, these barriers may be provided by programming an appropriate delay into the sensing device or by placing the sensor within the pack to be sterilized or by sealing the sensor in a material similar to the material in which the articles to be sterilized are sealed. In any event, FIG. 1 shows that the signal, such as a voltage signal, issued by each sensor and representative of the environmental condition being sensed by that sensor is fed by leads 10 first to an operational amplifier 16 and then to a sterility analyzer 12.

Amplifier 16 is located outside of the sterilizing chamber and merely amplifies the signals from the sensors. The output from the amplifier is then applied to the input of analyzer 12. The analyzer is a computer having two stages, an information processing logic portion circuit portion 22 and an integrator 24. The logic circuit portion converts each of the amplified signals from amplifier 16 into a kill factor or death rate for a given micro-organism.

Figure 2:
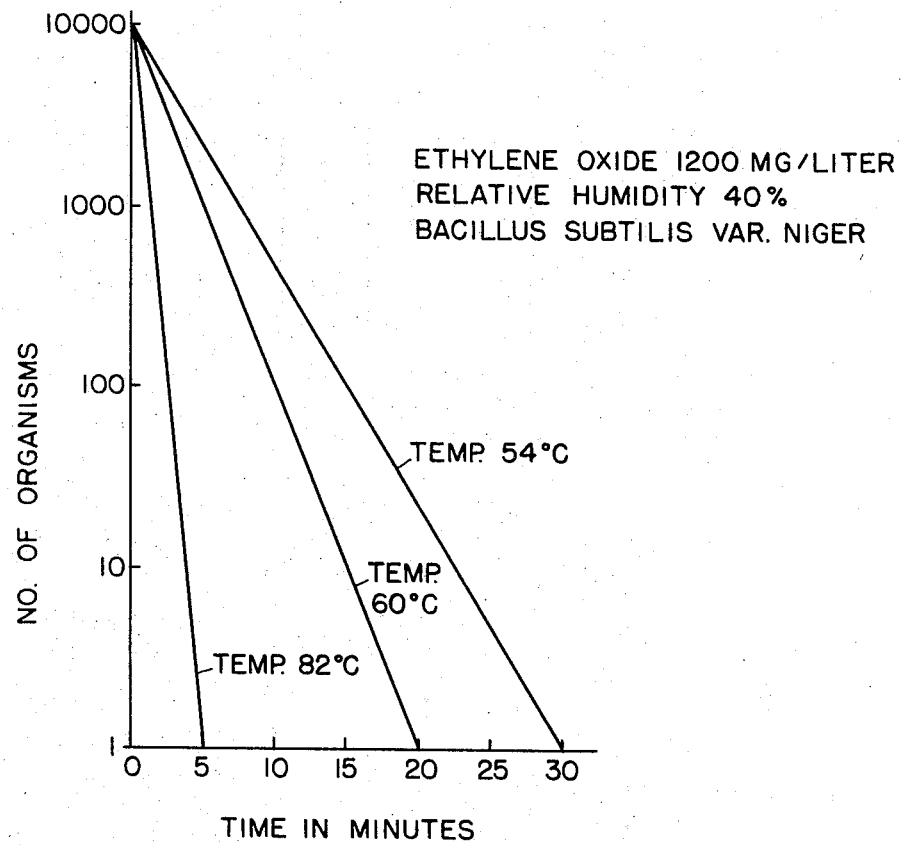
FIG. 2 is a graph showing a family of curves illustrating different death rates of a micro-organism at different temperatures.

The kill factor or death rate can be more particularly defined as the ratio of the number of surviving organisms over the number or organisms originally present. A typical family of curves illustrating the death rates obtained by varying one environmental condition, namely temperature, is shown in FIG. 2. The curves each represent the death rate of the bacillus subtilis var. niger obtained with gas sterilization wherein the ethylene oxide concentration and relative humidity for each run remained constant at 1,200 mg/liter and 40% respectively.

As can be appreciated from this family of curves, the death rate, that is the slope of each line, increases as temperature increases. In like respect, holding temperature and one other environmental condition constant while changing the third condition will likewise result in a family of curves.

It is well within the skill of the art to generate such families of curves and adopt the logic circuit portion to convert the sensed environmental condition to a death rate corresponding to the level of the sensed condition. If the condition varies, the logic circuit will simply "switch curves" to issue an output signal representative of the death rate for the changed conition.

The logic circuit thus produces an output 26 representative of the death rate for each of the sensed conditions, each output changing as the sensed condition changes. Each output 26 is in turn fed to the integrator portion 24 of the computer. The integrator portion sums all of the death rates during a given exposure time and issues an output signal 28 representative of the total number of micro-organisms which have been killed. In order to utilize the information regarding the number of microorganisms which have been killed, the output of integrator portion 24 is fed to a processing circuit 30 which develops this informations into a usable form. For example, circuit 30 may utilize the information to determine when sterility has been achieved, that is when the number of micro-organism killed equal the total number of micro-organisms originally present. At such time, the circuit may be programmed to issue a signal terminating the sterilizing cycle. Other uses of the output from circuit 30 would be to operate a recorder to print out the kill developed during a cycle; analyze various phases of a sterilizing cycle to determine their effectiveness in terms of the microorganisms killed during any particular phase; terminate the cycle when a malfunction has occurred, such as an excessive drop in temperature, humidity or concentration of ethylene oxide; or to terminate the sterilizing cycle when a predetermined percentage of the microorganism has been killed thereby eliminating an overkill situation and minimizing the exposure time of sensitive materials.

Thus, it should be appreciated that the present invention accomplishes its intended objects in providing a sterility analyzer which is capable of continuously monitoring the various environmental conditions within a sterilizer for determining both the death rate of a given micro-organism and then using such information to control the operation of the sterilizer.

Having described the invention in detail, what is claimed as new is:

1. A sterility analyzer comprising:
    a. a plurality of sensor means, each being capable of continuously monitoring one of a plurality of different sterilization affecting environmental conditions including temperature and humidity within a sterilization chamber and issuing a signal representative of said condition;
    b. means for receiving a signal from each of said sensor means and converting each of said signals to an output indicative of the death rate for a given micro-organism at each of said sensed conditions; and
    c. integrator means receiving said outputs and summing the same over a timed interval to obtain the total number of said micro-organism killed over said timed interval.

2. A sterility analyzer as set forth in claim 1, wherein said sensor means are located in said sterilization chamber; and further includes a plurality of leads connecting each of said sensor means to said second mentioned means.

3. A sterility analyzer as set forth in claim 1, including a barrier interposed between each of said sensor means and said sterilization chamber, said barrier representing the "worst load" condition within said sterilization chamber.

4. A sterility analyzer as set forth in claim 1, wherein said second mentioned means includes a logic circuit capable of relating the sensed condition to a curve representative of the death rate of said given micro-organism at the sensed condition.

5. A sterility analyzer as set forth in claim 1, wherein said sensor means are adapted for placement within the product to be sterilized.

6. A sterility analyzer as set forth in claim 1, wherein one of said sensor means monitors sterilizing gas concentration.

7. A sterility analyzer as set forth in claim 1, including a signal delay means associated with each of said sensor means.

8. A method for determining the total number of a given micro-organism killed during a sterilization process comprising the steps of:
    a. continuously monitoring a plurality of sterilization affecting conditions including temperature and humidity within a sterilizing chamber with a plurality of sensors capable of issuing a signal representative of each of the sensed conditions;
    b. continuously converting each of said signals to an output indicative of the death rate for said given micro-organism at the sensed conditions; and
    c. integrating said death rates over a timed interval to obtain the total number of said given micro-organism killed in said timed interval.

9. A method as set forth in claim 5, including the step of continuously monitor sterilizing gas concentration.

* * * * *